July 24, 1956 W. J. MATTOX 2,756,187
FLUID HYDROFORMING PROCESS
Filed April 1, 1952
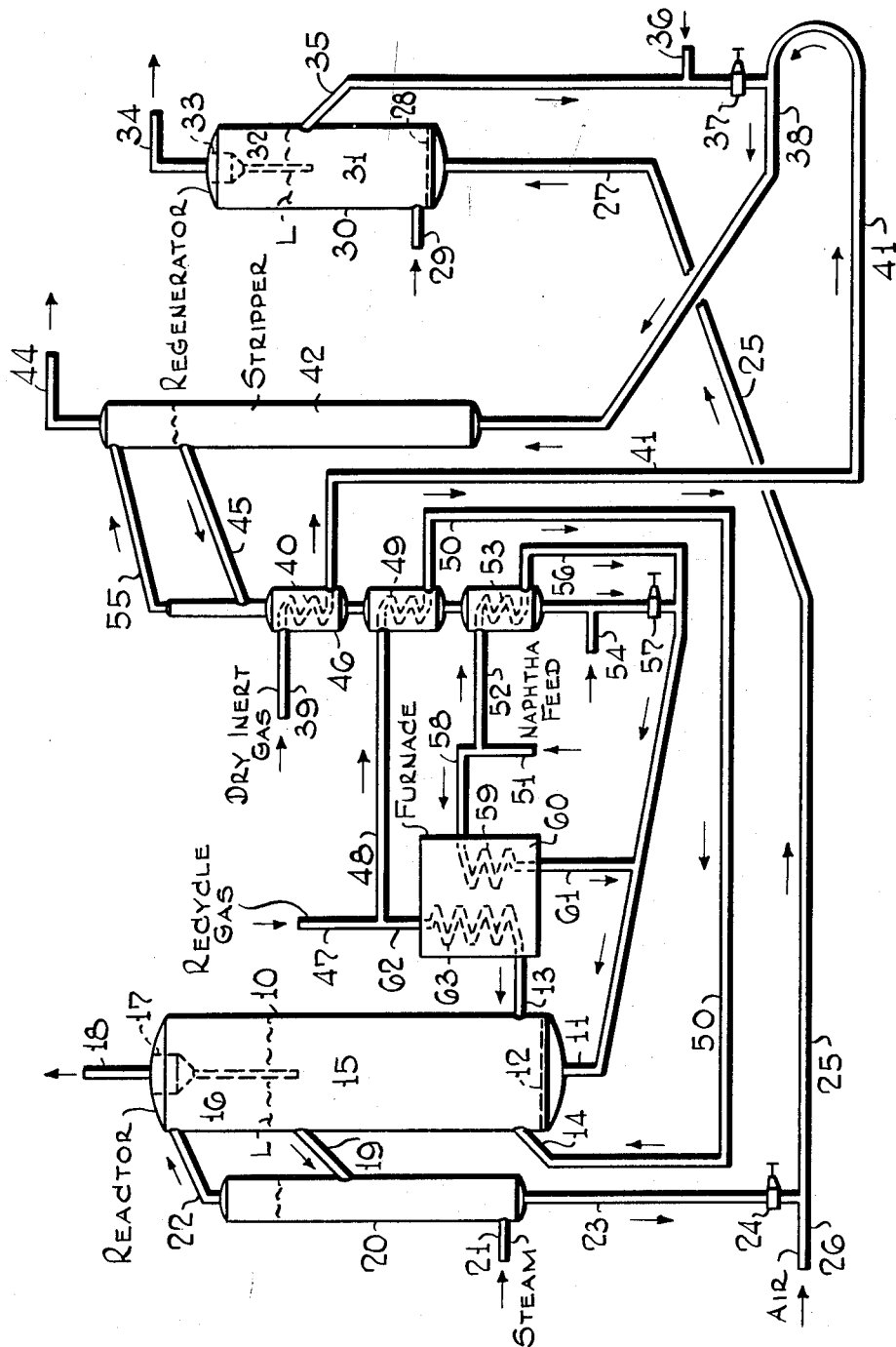
William J. Mattox Inventor
by J. Cashman Attorney United States Patent Office 2,756,187
Patented July 24, 1956

2,756,187

FLUID HYDROFORMING PROCESS

William J. Mattox, Baton Rouge, La., assignor to Esso Research and Engineering Company, a corporation of Delaware Application April 1, 1952, Serial No. 279,815

4 Claims. (Cl. 196—50)

This invention relates to the catalytic conversion of hydrocarbon fractions boiling within the motor fuel boiling range of low knock rating into high octane number motor fuels rich in aromatics and particularly to a process whereby such a conversion is effected by the fluidized solids technique.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or a hydrogen-rich recycle gas at temperatures of 750–1150° F. in the pressure range of about 50–1000 lbs. per sq. inch and in contact with such catalysts as molybdenum oxide, chromium oxide, or, in general, oxides or sulfides of metals of groups IV, V, VI, VII and VIII of the periodic system of elements, alone, or generally supported on a base or spacing agent such as alumina gel, precipitated alumina or zinc aluminate spinel. A good hydroforming catalyst is one containing about 10 wt. per cent molybdenum oxide upon an aluminum oxide base prepared by heat treating a hydrated aluminum oxide or upon zinc aluminate spinel.

It has been proposed in application Serial No. 188,236, filed October 3, 1950, now U. S. Patent No. 2,689,823, to effect the hydroforming of naphtha fractions in a fluidized solids reactor system in which naphtha vapors are passed continuously in admixture with hydrogen or hydrogen-rich recycle gas through a dense, fluidized bed of hydroforming catalyst particles in a reaction zone maintained at elevated temperatures and pressures, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed-bed hydroforming such as (1) the operations are continuous, (2) the vessels and equipment can be designed for single rather than dual functions, (3) the reactor temperature is substantially constant and (4) the regeneration or reconditioning of the catalyst may be readily controlled.

A particular advantage of the foregoing fluid solids operation has been the fact that the freshly regenerated catalyst can be utilized to carry part of the heat required for the hydroforming reaction from the regeneration zone into the reaction zone. It has been proposed in this connection to discharge hot, regenerated catalyst particles from the regenerator standpipe into a stream of hot, hydrogen-rich recycle gas in a transfer line whereby the catalyst particles are subjected to a reconditioning treatment involving at least a partial reduction of higher catalytic metal oxides formed during regeneration to a lower or more catalytically active form of catalytic metal oxide during its passage through the transfer line into the reaction zone. In view of the high temperature of the regenerated catalyst (1050–1200° F.) and the exothermic character of the reaction between the hot, freshly regenerate catalytic and the hydrogen, it is necessary to make the transfer line very short and of small diameter in order to keep the time of contact of the catalyst and hydrogen-containing gas sufficiently short to avoid overtreatment and/or thermal degradation of the catalyst.

Appreciable quantities of water are formed during the combustion of hydrogen adsorbed by and carbonaceous materials deposited on the spent catalyst in the regeneration zone and further amounts of water are formed in the pretreatment of the regenerated catalyst with hydrogen during its transfer from the regeneration zone to the reactor zone. This water renders the catalyst susceptible to losses in activity as well as in selectivity.

It is the object of this invention to provide a process whereby adsorption of water by the catalyst during its subsequent transfer from the regeneration zone to the reaction zone is minimized.

It is a further object of this invention to regenerate hydroforming catalyst under certain conditions and to render the regenerated catalyst suitable for recycling to the reactor vessel without a pretreatment with a hydrogen-containing gas.

These and other objects will appear more clearly from the detailed specification and claims which follow.

It has now been found that in a fluid hydroforming process employing a dehydrogenating metal or metal oxide supported on an alumina or other water adsorptive base material, it is advisable to carry out the regeneration of the spent catalyst at temperatures somewhat above those normally employed in such operations and then to subject the regenerated catalyst particles to stripping at high velocities with a low water content inert stripping gas. This combination of steps serves to remove maximum quantities of water from the catalyst or catalyst base material. Under ordinary conditions the catalyst or the catalyst base material retains appreciable percentages of water thereby rendering the catalyst highly susceptible to activity and selectivity losses following any subsequent water pick up by the catalyst such as tends to occur during the normal pretreatment of the regenerated catalyst with hydrogen-containing gas preparatory to returning the regenerated catalyst to the reaction zone or during normal operation when there is a definite partial pressure of water in the reactor. The low water content regenerated and stripped catalyst is then introduced directly into the reaction zone or cooled to reactor temperatures, contacted with all or a part of the naphtha feed and then introduced as rapidly as possible into the reaction zone without pretreatment or reduction with hydrogen. Recycle or hydrogen-rich gas is introduced separately into the reactor and contacts the freshly regenerated catalyst only after the latter has been quenched with hydrocarbon feed vapors. Under these conditions, the catalyst is less susceptible to water deactivation due to the previous adsorption of hydrocarbons which permits only a partial adsorption of water of reduction to occur in the reactor.

Reference is made to the accompanying drawing illustrating a schematic flow plan of one embodiment of the present invention.

In the drawing, 10 is the hydroforming reactor vessel provided at the bottom with an inlet line 11 for the introduction of catalyst and hydrocarbon feed vapors. It is desirable to provide a perforated plate or distributor grid 12 in the lower part of the reactor vessel to insure uniform distribution of the incoming vapors and catalyst over the entire cross section of the reactor vessel. An inlet line 13 for the introduction of preheated recycle gas is provided near the bottom of the reactor vessel and, if desired, a second inlet line 14 may be provided for the introduction of recycle gas that has been preheated by indirect heat exchange with freshly regenerated catalyst as will be described in detail herein below.

The reactor vessel 10 is charged with finely divided hydroforming catalyst particles and the superficial velocity of the vapors and gases passing through the vessel is so controlled as to form a dense, fluidized, turbulent bed of catalyst 15 having a definite level L superposed by a dilute or disperse phase 16 comprising small amounts of catalyst entrained in vaporous reaction products. The reaction products are taken overhead from the reactor, preferably through a cyclone separator 17 or the like for separating entrained catalyst particles from the reaction products. The recovered catalyst particles are returned to the dense bed 15 through the dip leg attached to the bottom of cyclone separator 17. The reaction products are conducted via line 18 to suitable fractionating and/or storage equipment.

Catalyst particles are continuously discharged from dense bed 15 through withdrawal conduit 19 into external stripper vessel 20. It will be understood that the stripper could also be arranged within the reactor vessel as by providing a vertical conduit or cell, preferably extending above level L and provided with an orifice or port for controlling the discharge of catalyst into the stripper cell or conduit. A tap 21 is arranged in the lower portion of the stripping cell or conduit for introducing steam or other suitable stripping gas which will serve to remove entrained or adsorbed hydrogen and/or hydrocarbon materials that would otherwise be carried to the regeneration zone and burned therein. The stripping gas and stripped out coonstituents are withdrawn overhead through line 22 and discharged into dilute phase 16 in the upper part of reactor 10 for recovery of entrained catalyst in the reactor cyclone separator 17. If it is desired to have the stripping gas by-pass the reactor completely, suitable connections could be readily provided for discharging the stripping gas directly into reactor products outlet line 18 or to suitable separate recovery means. The lower end of stripping vessel 20 is attached to conduit 23 and forms therewith a standpipe for developing sufficient fluistatic pressure in the spent catalyst discharged from stripper 20 to facilitate its transfer to the regenerator vessel. A slide valve 24 or the like is provided near the base of the standpipe 23 to control the withdrawal of catalyst from the reactor. If desired or if necessary to maintain the catalyst in a fluidized state, one or more gas taps can be provided along standpipe 23 to supply fluidizing gas.

The stripped, spent catalyst is discharged from the base of the standpipe 23 into transfer line 25 where it is picked up by a stream of regeneration gas or air supplied through inlet line 26. The mixture of catalyst and air passes through transfer line 25 and spent catalyst riser 27 through distributor plate or grid 28 into regenerator vessel 30. In order to prevent overtreatment of the spent catalyst in transfer line 25 and riser 27, it is preferably to use only part of the air necessary for regeneration for conveying the spent catalyst to the regenerator and to add the remainder of the air through a separate line 29 or additional lines discharging directly into the regenerator vessel.

The superficial velocity of the regeneration gases through vessel 30 is so controlled as to form a dense, fluidized, turbulent bed 31 of catalyst particles and gas having a definite level L' superposed by a dilute or disperse phase 32 in the upper part of regenerator vessel 30 comprising small amounts of catalyst suspended or entrained in the regeneration gases. The regeneration gases are taken overhead from regenerator 30 preferably through a cyclone separator 33 or the like. The catalyst particles separated in cyclone separator 33 are returned to the dense bed through the dip pipe attached to the bottom of the separator. The regeneration gases, substantially free of catalyst particles are withdrawn overhead through outlet line 34 and passed through a pressure control valve to a waste gas stack or to suitable washing and storage equipment in the event that it is desired to use the regeneration gases for stripping purposes.

Regenerated catalyst is discharged from dense bed 31 into conduit 35 which forms a standpipe for facilitating transfer of regenerated catalyst. One or more taps 36 may be provided along conduit 35 for the introduction of inert or fluidizing gas. A slide valve 37 is provided near the base of the standpipe 35 for controlling the discharge of regenerated catalyst from the regenerator standpipe into transfer line 38.

A dry stripping gas such as air, flue gas, nitrogen or the like is supplied through inlet line 39, preheater coils 40 and line 41 to pick up the freshly regenerated catalyst discharged from standpipe 35 and convey the same to regenerated catalyst stripper 42. By dry stripping gas is meant a gas having a water content below about 0.2 lb. per 1000 cu. ft. Stripping gas of this water content can be obtained by compressing to about 200 lbs. per sq. inch (a preferred pressure in this reaction system) and cooling the compressed gas to 100° F. or by passing the gas in contact with a suitable dehydrating agent. The stripping gas velocity through the stripper 42 is about 0.5 to 1.0 ft. per second at 200 p. s. i. or the approximate equivalent and forms a relatively dense bed of catalyst 43 in the stripper, the stripping gas essentially free of catalyst particles passing overhead through line 44. It may be desirable to pass the stripping gases through a cyclone separator before entering line 44, or the small amounts of catalyst suspended or entrained in the stripping gas may be recovered by passage through the upper portion of regenerator 30 and cyclone 33. Catalyst is discharged from bed 43 through connector line 45 into regenerated catalyst cooler 46 where it is cooled to substantially reactor temperature or to about 900° F. The cooling of the regenerated catalyst may be effected by indirect heat exchange with the dry stripping gas passing through heater coils 40, with recycle gas supplied through inlet line 47, by-pass line 48 and heater coils 49, with fresh naphtha feed supplied through naphtha feed inlet 51, line 52 and heater coils 53 as shown in the drawing or by passage in indirect heat exchange relation to the dense bed 15 in reactor 10 or to a stream of recycle reactor catalyst which could be circulated in indirect heat exchange to the stream of regenerated catalyst undergoing cooling. A stream of inert purging gas such as nitrogen or the like is preferably introduced at the lower part of regenerated catalyst cooler 46 to displace any small or residual amounts of oxygen or carbon oxides that may be entrained with or adsorbed upon the regenerated catalyst. Gases taken overhead from cooler 46 are passed through line 55 into the top of stripper 42.

The recycle gas preheated in heater coils 49 is passed through line 50 to recycle gas inlet 14 at the bottom of the reactor. Feed naphtha preheated in heater coils 53 is discharged through lines 56 into the inlet line 11. Regenerated catalyst is discharged from cooler 46 through slide valve 57 or the like into inlet line 11 where it is contacted and conveyed by means of the naphtha feed vapors. Contact of the cooled regenerated catalyst with the naphtha feed vapors causes the latter to become adsorbed upon the catalyst preventing to a large extent adsorption of water by the catalyst when contacted in the reactor with hydrogen-containing reactant mixture. The major part of the naphtha feed is passed through line 58, heater coils 59 in furnace 60 and thence through connecting line 61 into the inlet line 11 upstream a sufficient distance from the point of mixing of the feed naphtha vapors and freshly regenerated catalyst or close enough to the reactor 10 so that no appreciable reaction between the preheated naphtha and the catalyst will occur. It is preferable to keep the time of contact of the catalyst with the hydrocarbon feed prior to introduction into the reactor below about 10 seconds.

The major portion of the recycle gas supplied through line 47 is passed through line 62 and heater coils 63 in furnace 60 to recycle gas inlet 13 at the base of the reactor.

In the foregoing operation, the water content of the regenerated catalyst is reduced to a minimum through operation of the regenerator at high temperatures, i. e., 1150–1250° F. as compared to conventional temperatures of below about 1200° F. followed by stripping with a high velocity stream of dry inert gas. The dry, stripped regenerated catalyst is thereupon cooled to reactor temperatures, preferably by heat exchange with reactants and/or reactor catalyst, so that sensible heat of regenerated catalyst is effectively transferred to the reactor, whereupon the catalyst is saturated with feed hydrocarbon vapors preventing or minimizing water adsorption by the regenerated catalyst when it is subsequently discharged into the main reactor dense bed where it comes into contact with hydrogen-containing gases.

The feed or charging stock to the hydroforming reactor may be a virgin naphtha, a cracked naphtha, a Fischer-Tropsch naphtha or the like. The feed stock is preheated to reaction temperature or to the maximum temperature possible while avoiding thermal degradation. Ordinarily, preheating of the feed stock is carried out to temperatures of about 800–1000° F., preferably about 950° F. The naphtha preheat should be as high as possible while avoiding thermal degradation thereof, as by limiting the time of residence in the transfer or feed inlet lines. Part of the feed stock may be preheated to about 875–925° F. by indirect heat exchange with freshly regenerated catalyst and then directly mixed with the regenerated catalyst for introduction into the reactor vessel. The recycle gas, which contains from about 50 to 70 vol. per cent hydrogen, is preheated to temperatures of about 1150–1200° F., preferably about 1185° F., prior to the introduction thereof into inlet lines 13 and/or 14. The recycle gas should be circulated through the reactor at a rate of from about 1000 to 8000 cu. ft. per bbl. of naphtha feed. The amount of recycle gas used is generally the minimum amount that will suffice to supply the necessary heat of reaction and still keep carbon production at a low level.

The reactor system is charged with a mass of finely divided hydroforming catalyst particles. Suitable catalysts include group VI metal oxides, such as molybdenum oxide, chromium oxide or tungsten oxide or mixtures thereof upon a carrier such as activated alumina, zinc aluminate spinel or the like. Preferred catalysts contain about 5 to 15 wt. per cent molybdenum oxide or from about 10 to 40 wt. per cent chromium oxide upon a suitable carrier. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

The hydroforming reactor vessel should be operated at temperatures between about 850 and 925° F., preferably about 900° F. and at pressures between 50 and 500 lbs. per sq. inch. Temperatures above 900° F. result in increased carbon formation and lower selectivity to gasoline fractions while at temperatures below about 900° F. operating severity is low and would therefore require an excessively large reaction vessel. Lowering reactor pressure below 200 lbs. per sq. inch ordinarily results in increased carbon formation which becomes excessive below about 75 lbs. per sq. inch. Above 200 lbs., however, catalyst selectivity to light products ($C_4$'s and lighter) increases rapidly. The regenerator is operated at essentially the same pressure as the hydroforming reactor vessel and at temperatures of 1150–1250° F.

The weight ratio of catalyst to oil introduced into the reactor should be about 0.5 to 1.5. It is preferred to operate at catalyst to oil ratios of about 1 since ratios above about 1 to 1.5 result in excessive carbon formation. Somewhat higher weight ratios can be used at higher pressures.

Space velocity or the weight in pounds of feed charged per hour per pound of catalyst in the reactor depends upon the age or activity level of the catalyst, the character of the feed stock and the desired octane number of the product. Space velocity for a molybdenum oxide on alumina gel catalyst may vary, for example, from about 1.5 wt./hr./wt. to about 0.15 wt./hr./wt.

The foregoing description contains a limited number of embodiments of the present invention. It will be understood that numerous variations are possible without departing from the spirit of this invention.

What is claimed is:

1. In a process for hydroforming hydrocarbons boiling within the motor fuel range in contact with finely divided hydroforming catalyst particles in accordance with the fluidized solids technique at temperatures between about 850° F. and 925° F. and at pressures between 50 and 500 pounds per square inch the improvement which comprises continuously withdrawing a stream of spent hydroforming catalyst particles from a dense, fluidized bed of catalyst particles in the hydroforming reaction zone, regenerating the withdrawn catalyst particles by burning carbonaceous deposits therefrom in a regeneration zone maintained at temperatures of 1150–1250° F., withdrawing a stream of regenerated catalyst from the regeneration zone, stripping the hot regenerated catalyst with a dry, inert stripping gas, cooling the stripped regenerated catalyst to reactor temperature, mixing the cooled regenerated catalyst with naphtha feed vapors, rapidly discharging the resultant mixture of regenerated catalyst particles and naphtha feed vapors into the dense, fluidized bed of catalyst particles in the hydroforming reaction zone.

2. The process as defined in claim 1 in which the catalyst comprises a group VI metal oxide upon a support.

3. The process as defined in claim 1 in which the catalyst comprises molybdenum oxide upon an alumina support.

4. The process as defined in claim 1 in which the catalyst comprises molybdenum oxide upon a zinc aluminate support.

References Cited in the file of this patent

UNITED STATES PATENTS

| | | |
|---|---|---|
| 2,451,041 | Murphree | Oct. 12, 1948 |
| 2,459,824 | Leffer | Jan. 25, 1949 |
| 2,472,844 | Munday | June 14, 1949 |
| 2,518,693 | Jahnig | Aug. 15, 1950 |